May 7, 1929. L. G. COPEMAN 1,711,722
STORAGE COMPARTMENTS FOR ICE CREAM CABINETS OR THE LIKE
Filed Feb. 12, 1927
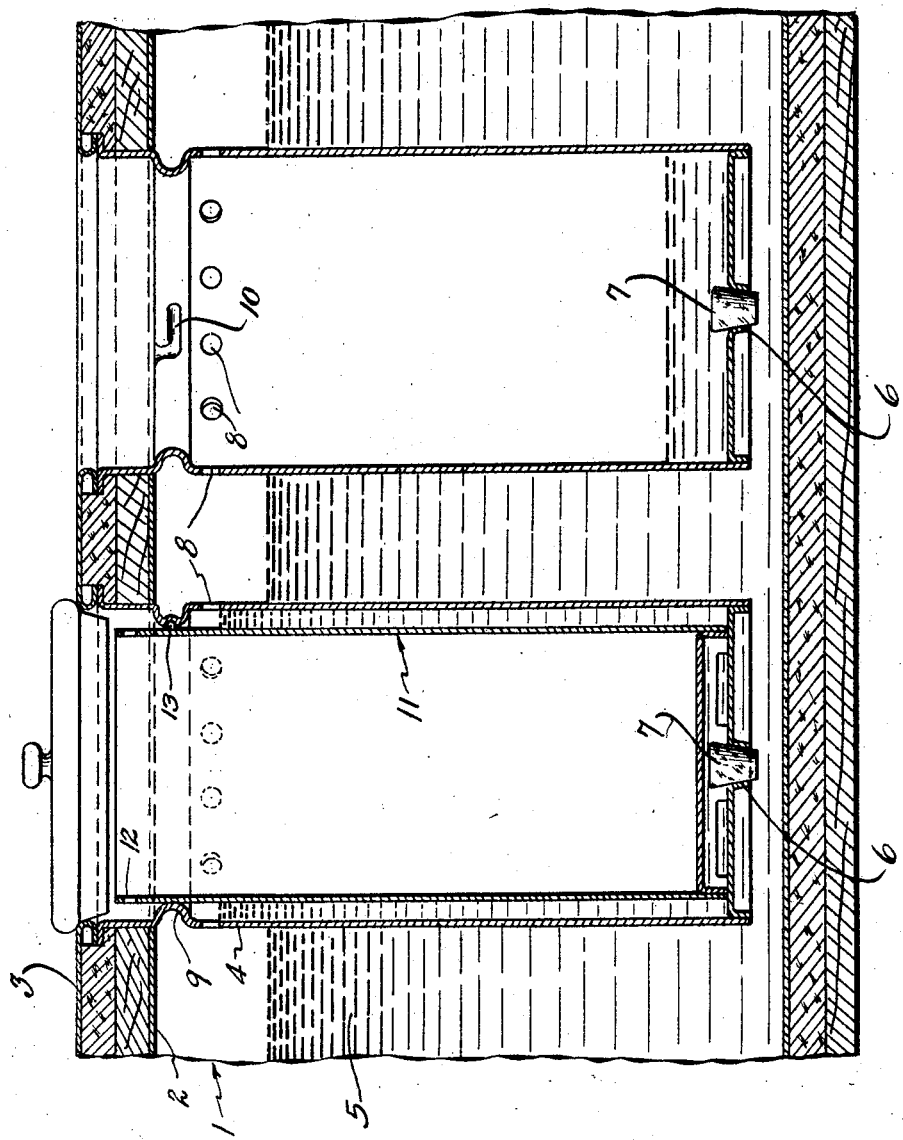
Inventor
LLOYD G. COPEMAN
By
Stuart C. Barnes
Attorney Patented May 7, 1929.

1,711,722

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

STORAGE COMPARTMENTS FOR ICE-CREAM CABINETS OR THE LIKE.

Application filed February 12, 1927. Serial No. 167,615.

This invention relates to storage compartments for ice cream cabinets or the like, and has to do particularly with a novel construction of storage container for receiving ice cream cans or similar articles, which container is adapted to be easily removable and replaceable to permit quick and easy cleaning thereof. It also has to do with the novel manner of maintaining the heat conducting relation with the refrigerating medium of the cabinet.

Heretofore in ice cream cabinets or similar devices having storage compartments for receiving the ice cream cans, it has been the practice to provide a metallic tank for receiving the brine or refrigerating medium and to rigidly secure or weld the compartment containers to the tank top, or cabinet top. One of the reasons for such construction is because of the high specific gravity of the brine and the resulting buoyancy of the compartment containers. Such constructions have produced other disadvantages besides the structural features and such other disadvantages have included the problem of sanitation. The storage container being permanent and the ice cream cans being removable, the space between the cans and the storage container walls has usually within a very short time become very unsanitary. Furthermore, the cleaning of the storage containers has been so difficult that as a general rule such containers have not been cleaned until it has been necessary to remove the top with all the containers at the factory for repairs, or for other reasons.

It is the object of the present invention to divide storage compartments, which are formed in two parts, one part being permanent and welded or otherwise secured to the brine tank, and the other part being easily removable at all times and therefore quickly cleanable and replaceable. This novel structure is accomplished by reason of the fact that I have provided a space between the temporary storage container and the permanent storage container which is adapted to be filled with a film of brine, such brine maintaining the heat conducting relation between the refrigerating means and the ice cream can. This film of brine preferably permits the temporary container to settle in the permanent container of its own weight. It permits the temporary container to be easily removed and cleaned, and it also permits the use of a temporary container of much thinner walls as there is very little chance of sticking, and in case of any puncturing of the walls thereof it does not affect the permanent container and thus does not necessitate expensive repair and complete replacement as is now the case in practically all commercial ice cream cabinets.

The drawing is a fragmentary vertical sectional view, somewhat diagrammatic, of an ice cream cabinet embodying my invention, and showing one form of permanent storage container and the manner of inserting the temporary container therein.

The present invention is designed for use particularly in connection with ice cream cabinets, or the like, utilizing brine as the refrigerating or heat transmitting medium. In the drawings I have illustrated, somewhat diagrammatically, a standard ice cream cabinet of the brine tank type, which may be generally designated 1. This tank is provided with metallic top and cover portions 3, and to the cover portion 3 I have shown welded a storage compartment container 4. It will be understood that this storage compartment container 4 may be welded to the metallic top 2, or may be otherwise secured in the cabinet, the point being in the present invention that it is preferably of a somewhat permanent nature being unnecessary to remove the same except upon very rare occasions.

The tank 1 is provided with the usual supply of brine 5 which is usually maintained at approximately the height shown. The bottom part of the permanent container 4 is preferably provided with a suitable aperture 6 for receiving a stopper, or valve member 7. The upper part of the permanent container 4 is provided with a series of apertures or openings 8 which are preferably positioned so as to be above the normal height of the brine 5. The upper part of the container 4 is also provided with an inwardly projecting annular portion 9 which forms a guide or bearing member for the temporary container about to be described. The annular portion 9 is preferably provided with one or more bayonet slots 10.

The storage container for directly receiving the ice cream can may be generally designated 11 and is preferably cylindrical in shape and open at the upper end. It may be provided with suitable apertures 12 at its upper end whereby to permit removal by hooks or other means. As shown, the bottom portion of the removable container 11 is provided with a recessed end, but it will be understood that such end may be formed in any manner desired. The portion of the removable container 11, which is positioned adjacent the annular depression 9, may be provided with one or more pins, as shown at 13, for registering with the bayonet slot, or slots 10, in the permanent container 4. In the usual construction of an apparatus embodying my invention such bayonet slots and pins will not be necessary as will be presently described, but in order to positively maintain the removable container 11 in place, such pins and bayonet slots may be provided.

In operation, the plugs 7 will be removed and an amount of brine allowed to flow into the permanent storage container, such as is shown in the right hand unit in the drawings. The plug will then be replaced and the removable or temporary storage container 11 inserted, as shown in the left hand unit of the drawings. The space between the two containers in the drawing is somewhat exaggerated and this preferably may be a relatively thin film whereby the weight of the inner container 11 will be sufficient to overcome any buoyant effect of the brine entrapped within the permanent container 4. As the inner container 11 is lowered by force, or its own weight, the brine will be forced upwardly along the sides and in the space between the two containers. The excess brine will flow back into the main body of brine by reason of the apertures 8. If the inner container 11 is of relatively thin material and a relatively large amount of brine is designed to be used in the space between the two containers, the pins 13 and the bayonet slots 10 may be utilized and the inner container 11 removably secured in place. The ice cream can may then be inserted within the removable container 11 and the brine between the permanent container 4 and the inner container will serve as a good conductor and holdover medium for transmitting the heat units between the main body of brine and the ice cream cans. When the ice cream can is empty it is only necessary to insert suitable hooks in the apertures 12, or to grasp the removable container 11 and remove the same from the cabinet, as the film of brine will prevent any freezing or formation of frost between the two containers. When the inner container 11 is removed from the cabinet it will be a very simple matter to remove the ice cream can, and even if the same is frozen within the container, it may be immersed in hot water and very quickly removed. After the ice cream can is removed it will be a very easy matter to thoroughly clean and sterilize the removable container. It will be obvious that this may be done at each removal of the ice cream can, or may be done at the end of the day or the end of the week, the point being, that it is removable and cleanable when desired and positively prevents any puncturing or otherwise damaging of the external permanent container 4. There is no reason why the inner container 11 should be punctured, but in case the same is punctured it may be very easily replaced with a minimum of expense.

It will be understood that if desired the plug 7 may be removed, the apertures 8 lowered and the bottom of the inner container 11 so formed that a free thermo-siphon action of the brine may take place between the inner and outer shells. However, this is entirely within the scope of applicant's invention, and it will be understood that the claims are intended to cover the interposition of the brine between the inner and outer containers whether stationary or subject to circulation.

What I claim is:

1. Ice cream cabinets, or similar structures of the type having a brine tank and a compartment container rigidly secured to the tank and extending within and surrounded by the brine, comprising in combination with said container of a readily removable imperforate container, for receiving the ice cream cans and the like, positionable within said fixed container, and a non-freezing solution filling the space between said fixed container and removable container.

2. In combination with an ice cream cabinet of the type having a brine tank and a compartment container or containers immersed therein, of an inner container adapted to be readily removable, and a small independent body of brine within said compartment container and adapted to be forced up between the inner compartment container by the inserting in place of said inner container.

3. An ice cream cabinet, or the like, comprising a brine tank, a fixed container immersed therein, a second container positioned within said first named container and a non-freezing solution isolated from said main body of brine and partially filling the space between said containers.

4. In an ice cream cabinet, or the like, of the type having a brine tank, a fixed container projecting in the brine and provided with apertures in the upper end thereof, and an aperture in the lower end thereof, a removable container positionable in said fixed container adapted to force the brine up between the walls of the two containers and adapted to force the surplus brine out through the apertures of the upper end of the fixed container and back into the main body of brine.

5. In an ice cream cabinet, or similar structure, the combination of a compartment container of heat conducting material adapted to transmit heat units between the refrigerating medium and the contents in the interior of the container, and a second container removably positioned within the inner compartment of said first container and spaced therefrom and adapted to receive the ice cream can or other article, the temperature of which is adapted to be controlled by the cabinet.

6. A method of positioning and controlling the temperature of ice cream cans in ice cream cabinets, or similar structures, of the type having a brine tank and rigidly secured containers projecting into the brine, which comprises interposing a receiving member between said container and the ice cream can or article to be cooled, and then interposing a conducting but non-freezing medium between said inner receiver and said container whereby to prevent the forming of frost and to permit ready removability of said receiver for cleaning.

7. The method of installing and controlling the temperature of ice cream cans forming a part of an ice cream cabinet of the type having a brine tank and a main container immersed therein, which comprises admitting a portion of the brine of the brine tank into said main container by means of a hole in the main container, then stopping the hole in the main container by means of a plug, and then placing a second container for the ice cream cans or similar articles into said first container whereby to force the brine upwardly between the space provided between the two containers, the said displaced brine insuring the transmission of heat units, preventing the formation of frost and permitting removability of said inner container.

8. The method of installing and controlling the temperature of compartments in ice cream cabinets, or similar structures, of the type having a fixed outer compartment and a removable inner compartment, which comprises placing the inner compartment within the outer compartment and maintaining a completely independent film of non-freezing solution between said two compartments.

9. An ice cream cabinet or similar structure comprising a brine tank, a container immersed therein and having an inlet for allowing the entrance of a limited quantity of brine into the container and a plug for said inlet, a series of outlet apertures in the upper end of said container positioned above the level of the main body of brine in the tank, and a second container positioned within said first named container to such a depth as to force the limited quantity of brine upwardly between the two containers.

10. The method of installing and controlling the temperature of compartments in ice cream cabinets and similar structures, of the type having an outer compartment having inlet and outlet apertures for the brine, which comprises enclosing a limited quantity of brine in the bottom of said container, inserting a container within said first named contaner to force the independent limited quantity of brine upwardly in a thin film between the two containers and to force any surplus brine out through the apertures in the outer container.

11. An ice cream cabinet, or the like, of the type having a brine tank and a container fixed to said brine tank and extending within the brine, comprising in combination of an imperforate container positioned within said fixed container, said imperforate container adapted to receive the ice cream can or other article, and a non-freezing solution filling the space between said imperforate container and said fixed container.

In testimony whereof I affix my signature.

LLOYD G. COPEMAN.